Feb. 11, 1969 D. G. BILLS ET AL 3,427,432

SUBLIMATION DEVICE

Filed June 10, 1966

INVENTORS
DANIEL G. BILLS
DEAN A. DENISON
KEITH A. WARREN

Cushman, Darby & Cushman
ATTORNEYS 3,427,432
Patented Feb. 11, 1969

3,427,432

SUBLIMATION DEVICE

Daniel G. Bills, Dean R. Denison, and Keith A. Warren, Boulder, Colo., assignors to Granville-Phillips Company, Boulder, Colo., a corporation of Washington Filed June 10, 1966, Ser. No. 556,683
U.S. Cl. 219—275 17 Claims
Int. Cl. F22b *3/00, 37/00*

ABSTRACT OF THE DISCLOSURE

Disclosed is a sublimation device wherein the material to be sublimated is mounted on a core, the core being made of a material having a high electrical resistivity and a high thermal conductivity such as beryllium oxide. Disposed within the core are a plurality of holes which extend parallel with the axis thereof. A plurality of helical, electrically conducting heating wires are respectively disposed within the plurality of holes, the helical wires being thermally bonded to the core.

This invention relates to sublimation devices and in particular but not exclusively it relates to devices for sublimating materials within the range of approximately 1000–1500° C.

In getter-ion vacuum pumps, means are required for sublimating relatively large quantities of a material such as titanium with low voltage power.

In many devices it is required to evaporate controlled amounts of metals and semiconductor materials onto a variety of substrates. In the production of thin film devices, such as resistors, capacitors, integrated circuits, memory units, etc., accurately controlled thin films are required. In the production of optical goods, thin dielectric films are often required.

Some evaporations are carried out from the liquid state but greater film purity can be achieved by evaporating from the solid state; that is by sublimation. With many materials, the alloying tendency is greatly reduced if the material remains in the solid state. Thus, this invention relates only to sublimation from the solid state.

Prior art devices may be grouped as follows according to the manner of heating the material to be sublimed:

(1) *Direct electric heating of the material to be sublimed.*—The material to be sublimed is heated by passing an electrical current directly through the material. This method is applicable only to conductors of electricity. Further, this method suffers from the following disadvantages:

(a) The resistance of the electric circuit changes as material is sublimed and hence close control of sublimation is difficult;

(b) The circuit is inherently unstable for if, for any reason, a portion of the sublimating material increases in temperatures slightly over the temperature of adjoining material, its resistance will increase and hence more power will be expended in the localized hot region. The increased power dissipation further increases the temperature and the result is sudden and catastrophic burnout; and (c) Impractically large heating currents are required if large amounts of material are to be heated because of the corresponding low resistance of the circuit.

(2) *Direct electric heating of composite material.*—The disadvantage of the instability mentioned above has been partially overcome by:

(a) Twisting refractory metal wires together with a wire of the metal to be sublimated;

(b) Permitting the material to be sublimated to diffuse out of a sintered tungsten rod such as in U.S. Patent 3,140,173; and (c) Using an 85% titanium-15% molybdenum alloy.

(3) *Electric heating of boats or ovens.*—The material to be sublimated is placed in an open refractory metal boat or in a partialy enclosed refractory metal oven. Current is then passed through the boat or oven to heat it and sublimate the material therein. These devices cannot readily handle large amounts of material and are highly directional.

(4) *Radiation heating.*—This method uses radiative heat transfer to heat the material to be sublimated. It is limited to materials which sublime at relatively low temperatures. It is impractical to sublimate a material such as titanium at 1350° C. in this manner because of the very high heater temperature required to transfer sufficient power. Tungsten heater wires will vaporize after a brief operating time.

(5) *Electron bombardment heating.*—In this method the conductive material to be sublimed is heated by electron bombardment. To initiate and maintain sublimation in such devices, high voltages must be present to accelerate the electrons and this is a great disadvantage in getter-ion vacuum pump devices which do not rely on sputtering. Unless some other pumping means is used to reduce the pressure sufficiently, high voltage discharges will occur and pumping cannot be initiated.

It has been found that all of the above disadvantages can be eliminated or greatly reduced by electrically insulating the material to be sublimated from the heating elements while maintaining a good thermal conduction path from the heater to the material to be sublimed. One material found suitable for this purpose at the temperature range of 1000–1500° C. is beryllium oxide. The following advantages are obtained:

(1) The heater resistance remains constant throughout the life of the sublimator;

(2) The tendency toward instability is eliminated because the use of parallel heater wires is possible;

(3) The heating current can be reduced to a very reasonable value even on large sublimators;

(4) Omnidirectional sublimation is readily obtained;

(5) The direct conduction heat flow path greatly reduces the temperature difference between the heater and the getter material compared with radiation heating;

(6) High voltages are not required to produce sublimation. Hence, the device can be used to start pumping at higher pressures; and (7) At high pressure the large surface area of hot getter material relative to the cross sectional area of the pump mouth or opening pumps some gases at a rate hundreds of times the rate which can be obtained by sublimation. In other words, at high pressure the hot titanium surface getters gas at an appreciable rate without the necessity of first sublimating the getter material. The gas chemically combines with the titanium to form a stable compound which diffuses into the bulk titanium. This unexpected advantage of the invention makes starting of getter-ion pumps using this type of sublimator very easy.

Accordingly, it is an object of this invention to provide an improved sublimation device wherein a large sample of material can be sublimed without excessive electrical currents or voltages.

It is another object of this invention to provide an improved sublimation device where the sample of material to be sublimated is not contaminated by other constituent materials of the device.

It is another object of this invention to provide an improved, omnidirectional sublimation device.

It is another object of this invention to provide an improved sublimation device operable over a wide range of pressures.

It is another object of this invention to provide an improved sublimation device operable over a wide range of pressures.

It is another object of this invention to provide an improved sublimation device which is resistant to the creation of hot spots.

It is another object of this invention to provide an improved sublimation device which getters active gases at an appreciable rate without the necessity of first sublimating the getter material.

It is another object of this invention to provide an improved sublimation device in which the sublimation of the sample is highly efficient, that is, substantially all of the sample is sublimed.

It is a final object of this invention to provide an improved sublimator operable in any orientation.

Other objects and advantages of this invention will become apparent upon reading the appended claims in conjunction with the following detailed description and the attached drawings, in which:

Figure 1:
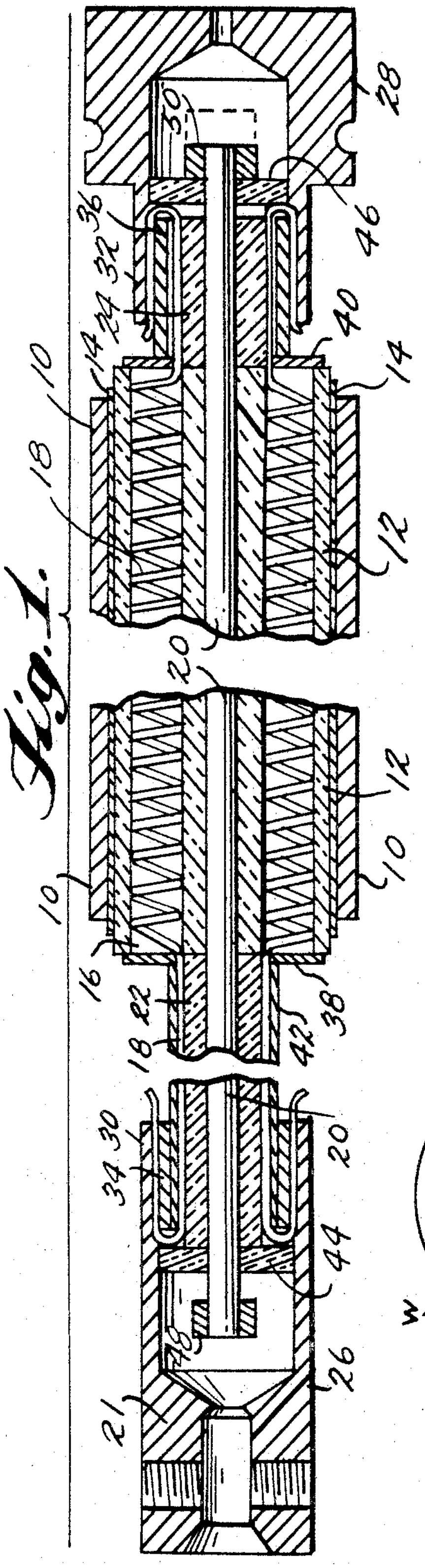
FIGURE 1 is a broken, cross-sectional view of an illustrative embodiment of the invention.
Figures 2, 3, 4, 5:
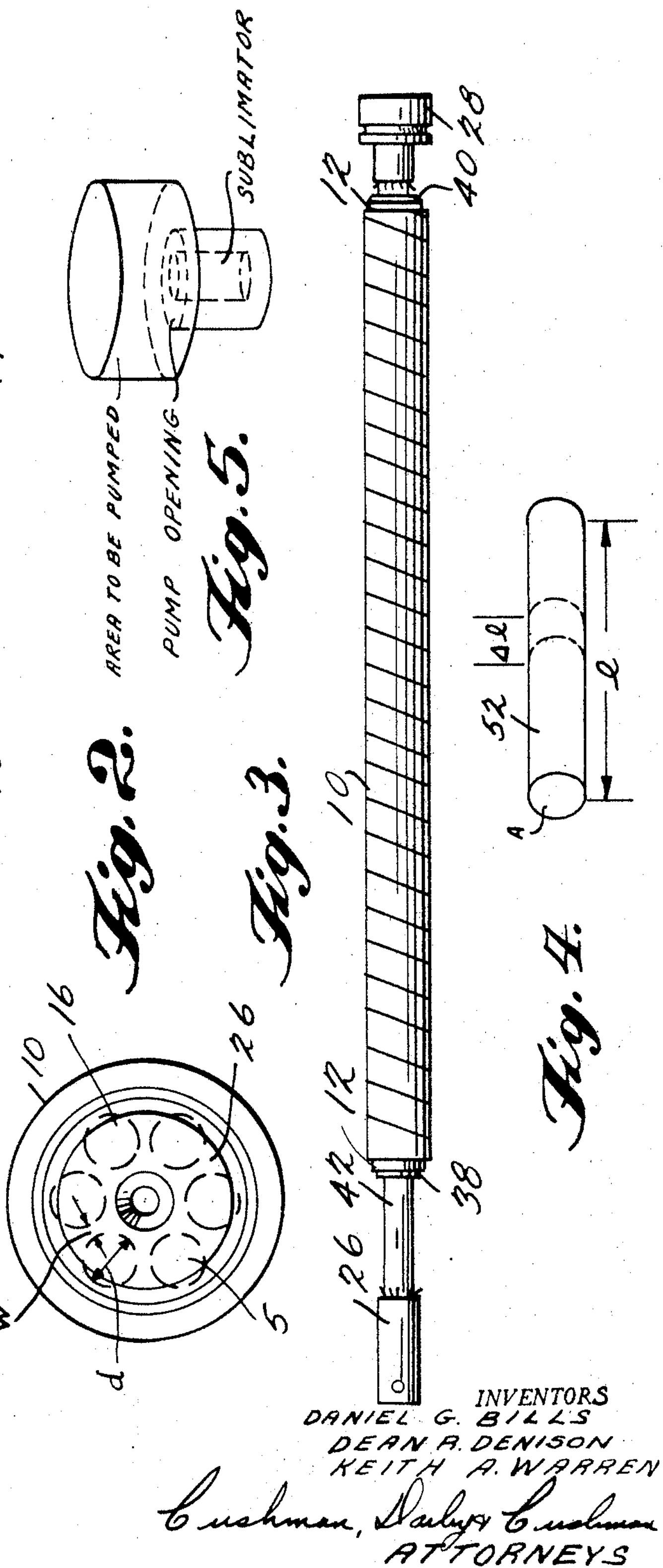
FIGURE 2 is a complete end view of the embodiment shown in FIGURE 1.
FIGURE 3 is a complete side view of the embodiment shown in FIGURE 1.
FIGURE 4 is a small element of the invention which illustrates an important mathematical relationship employed in the invention.
FIGURE 5 is a diagrammatic illustration showing the relationship of sublimator surface to pump opening.

Referring to FIGURE 1, there is shown the sample of material 10 to be sublimated, this being mounted around core or heat conducting member 12, which has a cylindrical shape, where the term "cylindrical" is used in its general sense. The sample 10 may have a helical shape as shown in FIGURE 3. In a getter vacuum pump, the sample could be titanium. Hereinafter, this will be assumed for the purpose of illustration; however, other materials, such as yttrium, which sublimes at a temperature 100° C. lower than the sublimation temperature of titanium, are also suitable. The helix is used to insure a tight fit on the core 12, the diameter of which may slightly vary from device to device. Further, the helix compensates for the differences in the thermal expansion of titanium and beryllium oxide.

A thin film or foil or separating member 14 is placed between the titanium 10 and the core 12 to prevent the highly reactive titanium from attacking the beryllium oxide core. The separating member 14 may be made by rolling a thin sheet of molybdenum foil into a hollow cylindrical shape, which is placed between the titanium 10 and the core 12. Thus, the titanium is prevented from attacking the core 12, and producing a low melting point eutectic, which would contaminate the titanium. Preferably, the member 14 is at least 0.0001 inch thick.

A thick slurry made by mixing a fine molybdenum powder with glycerine may be painted onto the surface of core 12 before the foil 14 is fitted in place, thereby improving the thermal conductivity between the core 12 and the foil 14. This slurry may also be painted over the outer surface of the foil 14, before the titanium helix is fitted in place to improve the thermal conductivity between the helix and the molybdenum foil 14. This also improves the thermal conductivity between the titanium 10 and the core 12, thereby resulting in more uniform heating of the titanium.

Referring to FIGURE 2, there are shown six holes or openings 16 in the core 12 which are disposed around and parallel to the axis of the core. Respectively inserted into each of these holes is a heater wire or electrically conducting heating means 18, see FIGURE 1. The wires 18 may be helically shaped inside of the holes 16 and composed of 97% tungsten and 3% rhenium. By helically shaping the wires, a greater heater surface is exposed to the core 12. The adjacent turns of the wires 18 are insulated from one another and thermally bonded to the core 12 by a thick slurry (not shown) made by mixing fine hafnium oxide powder and water. By insulating the adjacent turns from one another, the probability of hot spots developing at some point along the helix is minimized thereby reducing the probability of catastrophic burnout. This slurry may be forced into each of the holes 16 after the wires 18 are in place.

A rod member 20 provides structural rigidity for the sublimation device at the high operating temperatures. Preferably, the rod 20 is made of tungsten. Tubular insulator members 22 and 24 insulate the rod 20 from the heater wires 18. The number and spacing of the holes 16 is so chosen that the heat flow from heater wires 18 to the titanium 10 is maximized. The heater wire hole diameter, $d$, should be no more than about 2.6 times the web distance, $w$, between holes measured circumferentially, see FIG. 2. If the holes are placed too close together the heat generated near the interior of the insulating core cannot flow radially outward until the interior core temperature rises substantially above the outer core temperature. The rate of chemical reactions between heater wire and insulator is thus increased and premature failure results.

The heater wires 18 extend from the core 12 for electrical connection to a suitable heater power source (not shown). The terminals for the heater power source are connectors 26 and 28. The connectors 26 and 28 respectively include integral sleeves 30 and 32. The heater wires 18 are in electrical contact with these sleeves. The connectors 26 and 28, together with the sleeves therefor, may be made of nickel.

The heater wires 18 may be crimped or swaged between tubes 34 and 36 and sleeves 30 and 32 respectively. Thus, the six heater wires 18 are in electrical parallel with each other and in series with the heater power source. The tubes 34 and 36 may be made of molybdenum.

Plates 38 and 40 are disposed at the end of core 12 to prevent titanium vapor from attacking the heating wires 18 within the holes 16. Plate 38 may be attached to the end of a tube 42 which also prevents the titanium vapors from attacking the wires 18. The plates 38 and 40 and tube 42 may also be made of molybdenum.

Insulating plates 44 and 46 insulate the rod 20 from the source of electrical power. These plates may be made of aluminum oxide.

End rings 48 and 50 are mounted on the ends of rod 20 to retain the rod within the core 12. These end rings may be made of molybdenum.

In order to prevent thermal runaway at operating temperature, certain critical relationships must exist between the thermal and electrical properties of the material of the core 12. There is necessarily a potential drop along the heater wires 18. Thus, there is an electrical leakage path from the heater wires through the core to the titanium, back through the core to the heater coils at the other end of the sublimator. For example, if current is flowing from left to right in FIGURE 1, there will be a leakage path starting from the portion of heater wire 18 located near plate 38 through the core 12 to the titanium and back through the core 12 to the portion of heater wire 18 located near plate 40. If the electrical power dissipated in the core cannot flow out as rapidly as it is generated, then the core temperature rises uncontrollably, the resistivily of the core falls and catastrophic failure occurs.

To avoid thermal runaway at operating temperature, the temperature coefficient of rate of heat flow through the core shall be greater than the temperature coefficient of power generation in the core.

Consider a small element 52 of core as shown in FIGURE 4 of cross-section A and length $l$ disposed between the heater wire and the titanium. Let $l$ be the minimum distance between the heater wire and the titanium. The rate of heat flow out of the short element $\Delta l$ is $$Q=kA\Delta T/\Delta l \quad (1)$$

where $k$ is the heat conductivity of the core material at operating temperature and $\Delta T$ is the temperature drop across the element of length $\Delta l$. The power generated in the insulator element $\Delta l$ is $$P=\frac{E^2\Delta l}{\rho\frac{\Delta l}{A}} \quad (2)$$

Here $E_{\Delta 1}$ is the voltage drop across the length $\Delta l$ and $\rho$ is the resistivity of the core material at operating temperature.

To prevent thermal runaway one must require that:

$$\frac{dQ}{dT}\geq\frac{dP}{dT} \quad (3)$$

or $$k-dT\frac{dk}{dT}\geq-\frac{E^2\Delta l}{\rho^2}\frac{d\rho}{dt}$$

$$(4)$$

$$k+\Delta T\frac{dk}{dT}\geq\frac{E^2\Delta l}{dT}\cdot\left|\frac{d\rho}{dT}\right|$$

For no thermal runaway, this inequality must be true even for the limit that $\Delta T\rightarrow 0$, that is $$k\geq\frac{E^2\Delta l}{\rho^2}\cdot\left|\frac{d\rho}{dT}\right| \quad (5)$$

Because $\Delta l$ was chosen arbitrarily and is never very large, Equation 5 may be written as $$k_{AVG}\geq\frac{E^2}{\rho_{AVG}{}^2}\cdot\left|\frac{d\rho}{dT}\right| \quad (6)$$

where the average values are for the entire element of length $l$ and E is the voltage drop across length $l$.

Equation 6 defines the critical relationship between the thermal and electrical properties of a core and the heater voltage in the sublimator to prevent thermal runaway. Any core material which satisfies the conditions of Equation 6 at operating temperature may be suitable, provided impurity migration in the insulator does not change the values of $k_{AVG}$, $\rho_{AVG}$, and $d\rho/dT$ with time and temperature so that Equation 6 is not satisfied.

Of present day insulators, beryllium oxide appears to be the most suitable core material. Beryllium oxide has a high electrical resistivity and a high thermal conductivity at high temperatures, particularly in the range from 1000–1500° C. Further, in the range of 1300–1400° C., beryllium oxide is particularly suitable for the sublimation of titanium. The thermal conductivity at room temperature is surpassed by only two metals, silver and copper. For a general discussion of the physical properties of beryllium oxide, reference can be made to Kirk-Othmer, Encyclopedia of Chemical Technology, vol. 3, pp. 476–477, 1964, published by John Wiley & Sons, Inc.

It has been found that a hot titanium surface getters active gases very effectively without the necessity of first subliming the titanium. The effect is noticeable at about 1100° C. for a clean titanium surface, rises to a maximum for nitrogen of about 1.0 liter/sec. per square centimeter of hot surface area at about 1300° C. and then decreases rapidly with further increase in the temperature. For a clean titanium surface, the pumping speed of a surface is independent of the pressure unlike the sublimation pumping speed which decreases rapidly with increasing pressure. Therefore, at a pressure of $10^{-2}$ torr the pumping speed produced by the hot surface can be hundreds of times greater than the sublimation pumping speed at the same surface temperature and pressure. This high pumping speed is of great advantage in starting a getter ion pump at high pressure.

Prior art sublimators have always used such small hot surface areas relative to the cross-sectional area of the pump opening that the sublimator necessarily had to be operated at very high temperature to achieve the required pumping speed. Because the surface gettering effect is negligible on titanium above about 1400 ° C. the surface gettering effect has not been used before. Thus, it has been observed that if the hot gettering surface area is at least 10% of the cross-sectional area of the pump mouth or opening that easy starting at high pressure can be achieved, see FIGURE 5.

Typical full operating power for the sublimation device is 750 watts when it is operated in a getter-ion vacuum pump. The pump is initially operated at full power. The power is then reduced to a value corresponding to a lower sublimation rate. That is, when the pressure is approximately $10^{-6}$ torr, the operating power should be approximately 750 watts to achieve maximum pumping speeds of 1500 liters/sec., for example. However, as the pressure decreases to $10^{-8}$ torr, only about 450 watts are required to achieve the same pumping speed. Thus, the operating life of the pump is extended because of the lower required operating power. This becomes very important when it is required to continuously operate the pump for periods of a year or more. Many of the prior art devices have such a low resistance that it is not possible to control the power input with sufficient accuracy to prolong the life of the sublimator. Consequently, they are run intermittently at full power when it is desired to conserve getter material. This is a great disadvantage because each time the getter material is cooled and then heated it liberates large quantities of gas.

Many modifications of the invention will become apparent to one of ordinary skill in the art upon reading the foregoing disclosure. During such a reading, it will be evident that this invention has provided a unique device for accomplishing the objects and advantages herein stated. Still other objects and advantages, and even further modifications will be apparent from this disclosure. It is to be understood, however, that the foregoing disclosure is to be considered exemplary and not limitative, the scope of the invention being defined by the following claims.

What is claimed is:

1. A device for sublimating materials, said device utilizing a source of electrical power and comprising:

at least one electrically conducting heating means responsive to said power source for delivering heat to said material;

a heat conducting member, disposed between said material to be sublimated and said heating means having an average heat conductivity defined as follows:

$$k_{AVG}\geq\frac{E^2}{\rho_{AVG}{}^2}\cdot\left|\frac{d\rho}{dT}\right|$$

where:

$k_{AVG}$=the average heat conductivity,

E=the voltage drop across the length of the heat conducting material between the material to be sublimated and the heating means, $\rho$=the average value of the electrical resistivity of the heat conducting member; and $d\rho/dT$=the rate of change of the resistivity with respect to temperature for the heat conducting material; and where said heat conducting member has a cylindrical shape and where said material to be sublimated is a helically shaped strip mounted on said cylindrical shaped member.

2. A device for sublimating materials at temperatures of approximately 1000–1500° C., said device utilizing a source of electrical power and comprising:

a beryllium oxide core having a plurality of holes disposed around and extending parallel to the axis of said core; and a plurality of electrically conducting, heating wires responsive to said source and respectively mounted in said holes;

said material to be sublimated being mounted on said core.

3. A device as in claim 2 where said material to be sublimated is titanium and said temperature range is 1300–1400° C.

4. A device as in claim 3 where said titanium is a helical strip.

5. A device for sublimating materials, said device utilizing a source of electrical power and comprising:

at least one electrically conducting heating means responsive to said power source for delivering heat to said material; and a heat conducting member thermally bonded to said heating means and disposed between said materials to be sublimated and said heating means, said heat conducting member mechanically supporting said material to be sublimated and having an average heat conductivity defined as follows:

$$k_{AVG} \geq \frac{E^2}{\rho_{AVG}^2} \cdot \left| \frac{d\rho}{dT} \right|$$

where:

$k_{AVG}$=the average heat conductivity,

E=the voltage drop across the length of the heat conducting material between the material to be sublimated and the heating means, $\rho$=the average value of the electrical resistivity of the heat conducting member; and $d\rho/dT$=the rate of change of the resistivity with respect to temperature for the heat conducting material.

6. A device as in claim 5 where said heat conducting member is composed of beryllium oxide.

7. A device as in claim 6 where the material to be sublimated is titanium and the temperature range is 1300–1400° C.

8. A device as in claim 5 where said heat conducting member symmetrically distributes heat to said material to be sublimated.

9. A device as in claim 5 where said material to be sublimated is so disposed on the heat conducting member that differences between the thermal expansions of the material and the heat conducting member are compensated for.

10. A pump incorporating a sublimation device as in claim 5 where the surface area of said material to be sublimated is at least 10% of the area of the pump opening, thereby causing active gases to be effectively gettered without first subliming the said material.

11. A device for sublimating materials, said device utilizing a source of electrical power and comprising:

at least one electrically conducting heating means responsive to said power source for delivering heat to said material;

a heat conducting member, disposed between said material to be sublimated and said heating means having an average heat conductivity defined as follows:

$$k_{VAG} \geq \frac{E^2}{\rho_{AVG}^2} \cdot \left| \frac{d\rho}{Td} \right|$$

where:

$k_{AVG}$=the average heat conductivity,

E=the voltage drop across the length of the heat conducting material between the material to be sublimated and the heating means, $\rho$=the average value of the electrical resistivity of the heat conducting member; and $d\rho/dT$=the rate of change of the resistivity with respect to temperature for the heat conducting material; and where said heat conducting member is a cylindrical core having a plurality of holes disposed around and extending parallel to the axis of said core; each of said holes having one of said heating means included therein.

12. A device as in claim 11 where each of said heating means is a helical wire.

13. A device as in claim 12 where the adjacent turns of the helical wire are electrically insulated from one another.

14. A device as in claim 11 including a separating member disposed between said material to be sublimated and said core for eliminating chemical reaction therebetween.

15. A device as in claim 14 where said separating member is at least 0.0001 inch thick.

16. A device as in claim 14 where said separating member is made of molybdenum.

17. A device as in claim 11 where said holes are disposed around said axis so that the hole diameters are less than or equal to about 2.6 times the web distance between holes measured circumferentially, thereby causing the heat flow from said heating wires to said materials to be sublimated to be maximized.

References Cited

UNITED STATES PATENTS

| | | | |
|---|---|---|---|
| 1,850,076 | 3/1932 | Hacker | 219—275 |
| 2,447,789 | 8/1948 | Barr | 219—422 |
| 3,005,171 | 10/1961 | Beckman | 338—28 |
| 3,136,878 | 6/1964 | Staller | 219—239 |
| 3,248,680 | 4/1966 | Ganci | 338—266 |

FOREIGN PATENTS

| | | |
|---|---|---|
| 722,866 | 2/1955 | Great Britain. |

RICHARD M. WOOD, *Primary Examiner.*

C. L. ALBRITTON, *Assistant Examiner.*

U.S. Cl. X.R.

219—538; 118—48; 266—5